US009422016B2

(12) United States Patent
Mangiarino

(10) Patent No.: US 9,422,016 B2
(45) Date of Patent: Aug. 23, 2016

(54) SELF-ADAPTIVE METHOD FOR MOUNTING SIDE DOORS ON MOTOR-VEHICLE BODIES

(75) Inventor: Carlo Mangiarino, Orbassano (IT)

(73) Assignees: C.R.F. SOCIETÀ CONSORTILE PER AZIONI, Orbassano (Torino) (IT); COMAU S.P.A., Grugliasco (Torino) (IT)

( * ) Notice: Subject to any disclaimer, the term of this patent is extended or adjusted under 35 U.S.C. 154(b) by 194 days.

(21) Appl. No.: 13/993,950

(22) PCT Filed: Oct. 18, 2011

(86) PCT No.: PCT/IB2011/054623
§ 371 (c)(1),
(2), (4) Date: Jul. 17, 2013

(87) PCT Pub. No.: WO2012/080855
PCT Pub. Date: Jun. 21, 2012

(65) Prior Publication Data
US 2014/0165360 A1    Jun. 19, 2014

(30) Foreign Application Priority Data
Dec. 13, 2010 (EP) .................................... 10194673

(51) Int. Cl.
*B62D 65/00* (2006.01)
*B23Q 17/00* (2006.01)
(Continued)

(52) U.S. Cl.
CPC .............. *B62D 65/06* (2013.01); *B62D 65/028* (2013.01); *Y10T 29/4978* (2015.01); *Y10T 29/49769* (2015.01); *Y10T 29/49778* (2015.01)

(58) Field of Classification Search
CPC ................... Y10T 29/49764; Y10T 29/47769; Y10T 29/49778; Y10T 29/4978; Y10T 29/49622; B65D 65/06; B23P 19/10; B23P 19/102; E05Y 2600/56; E05Y 2600/60; E05Y 2600/62; E05Y 2900/50
See application file for complete search history.

(56) References Cited

U.S. PATENT DOCUMENTS 4,589,184 A * 5/1986 Asano et al. .................... 29/430
4,589,199 A * 5/1986 Ohtaki et al. ................... 29/714
(Continued)

FOREIGN PATENT DOCUMENTS

DE    3734369 A1 * 4/1989 ............. B60J 5/0431
DE    100 26 192      11/2001
(Continued)

OTHER PUBLICATIONS

Machine English translation of FR 2765547 A1, published Jan. 8, 1999.*
(Continued)

*Primary Examiner* — Essama Omgba
(74) *Attorney, Agent, or Firm* — Nixon & Vanderhye P.C.

(57) ABSTRACT

A method for mounting side doors on motor-vehicle bodies involves
detecting—by means of optoelectronic systems—a plurality of dimensions measured along coordinates X, Y, Z, on the body and on the door units, with the aid of the proper references, for qualifying the geometric conditions of the coupling between the doors and the cooperating door receiving seats. On the basis of the detected dimensions, the method determines the mounting positions of each pair of hinge elements to be secured to the body and to the doors for accurate fit. The method involves
mounting the hinge elements on the body in the determined positions, and
mounting the doors on the body by connecting the body hinge elements and the door hinge elements to each other by simultaneously inserting articulation pins in seats, without requiring further operations for adjusting and recording geometrical settings.

12 Claims, 3 Drawing Sheets

(51) Int. Cl.
*B62D 65/06* (2006.01)
*B62D 65/02* (2006.01)

(56) References Cited

U.S. PATENT DOCUMENTS

| | | | | |
|---|---|---|---|---|
| 4,736,515 A * | 4/1988 | Catena | | 29/714 |
| 4,765,025 A * | 8/1988 | Salazar | | 16/261 |
| 4,881,298 A * | 11/1989 | Turnbull | | E05D 5/062 16/266 |
| 5,040,290 A * | 8/1991 | Usui | | B62D 65/06 29/281.1 |
| 5,181,307 A * | 1/1993 | Kitahama et al. | | 29/434 |
| 5,203,811 A * | 4/1993 | Hirotani | | B62D 65/06 29/407.05 |
| 5,263,227 A * | 11/1993 | Hrbek | | E05D 5/121 16/224 |
| 6,122,813 A * | 9/2000 | Roy et al. | | 29/407.09 |
| 6,247,744 B1 * | 6/2001 | Townsend | | E05D 11/0027 16/388 |
| 6,311,382 B1 * | 11/2001 | Jack | | 29/464 |
| 6,643,905 B2 * | 11/2003 | Rhoads et al. | | 29/407.09 |
| 6,691,392 B2 * | 2/2004 | Savoy et al. | | 29/407.09 |
| 6,711,800 B2 * | 3/2004 | Savoy | | 29/434 |
| 6,908,728 B2 * | 6/2005 | Endo et al. | | 430/292 |
| 6,910,254 B2 * | 6/2005 | Aoki et al. | | 29/464 |
| 6,918,167 B2 * | 7/2005 | Hughes | | 29/407.09 |
| 6,954,980 B2 * | 10/2005 | Song | | 29/714 |
| 7,036,210 B2 * | 5/2006 | Jung | | 29/714 |
| 7,100,258 B2 * | 9/2006 | Tassakos | | B62D 65/06 269/21 |
| 7,143,494 B2 * | 12/2006 | Savoy | | 29/407.1 |
| 8,302,288 B2 * | 11/2012 | Pastrick et al. | | 29/714 |
| 8,365,381 B2 * | 2/2013 | Carter et al. | | 29/407.1 |
| 8,434,214 B2 * | 5/2013 | Marx | | 29/700 |
| 8,898,877 B2 * | 12/2014 | Lee et al. | | 29/281.4 |
| 9,242,322 B2 * | 1/2016 | Jin | | B23P 21/00 |
| 2002/0023334 A1 * | 2/2002 | Rhoads et al. | | 29/434 |
| 2002/0144388 A1 | 10/2002 | Mercier et al. | | |
| 2003/0224256 A1 * | 12/2003 | Endo et al. | | 430/9 |
| 2004/0148737 A1 * | 8/2004 | Dunneback et al. | | 16/221 |
| 2005/0055824 A1 * | 3/2005 | Jung | | 29/719 |
| 2006/0107507 A1 * | 5/2006 | Brose | | B25J 9/1684 29/407.1 |
| 2008/0303307 A1 * | 12/2008 | Savoy | | 296/146.11 |
| 2011/0174424 A1 * | 7/2011 | Briault | | 156/91 |
| 2012/0017413 A1 * | 1/2012 | Carter et al. | | 29/428 |
| 2014/0167342 A1 * | 6/2014 | Jin | | B23P 21/00 269/27 |
| 2014/0366394 A1 * | 12/2014 | Han | | G01B 5/25 33/600 |
| 2015/0013133 A1 * | 1/2015 | Lee | | 29/281.6 |

FOREIGN PATENT DOCUMENTS

| | | | | |
|---|---|---|---|---|
| EP | 1 245 479 | | 10/2002 | |
| EP | 2463182 A1 * | | 6/2012 | B62D 65/06 |
| FR | 2 765 547 | | 1/1999 | |
| FR | 2765547 A1 * | | 1/1999 | B62D 65/06 |
| WO | WO 0218196 A1 * | | 3/2002 | B62D 65/06 |

OTHER PUBLICATIONS

Machine English translation of JP 02-258485 publihsed Oct. 1990.*
International Search Report for PCT/IB2011/054623 mailed Feb. 6, 2012.
Written Opinion of the International Searching Authority mailed Feb. 6, 2012.

* cited by examiner

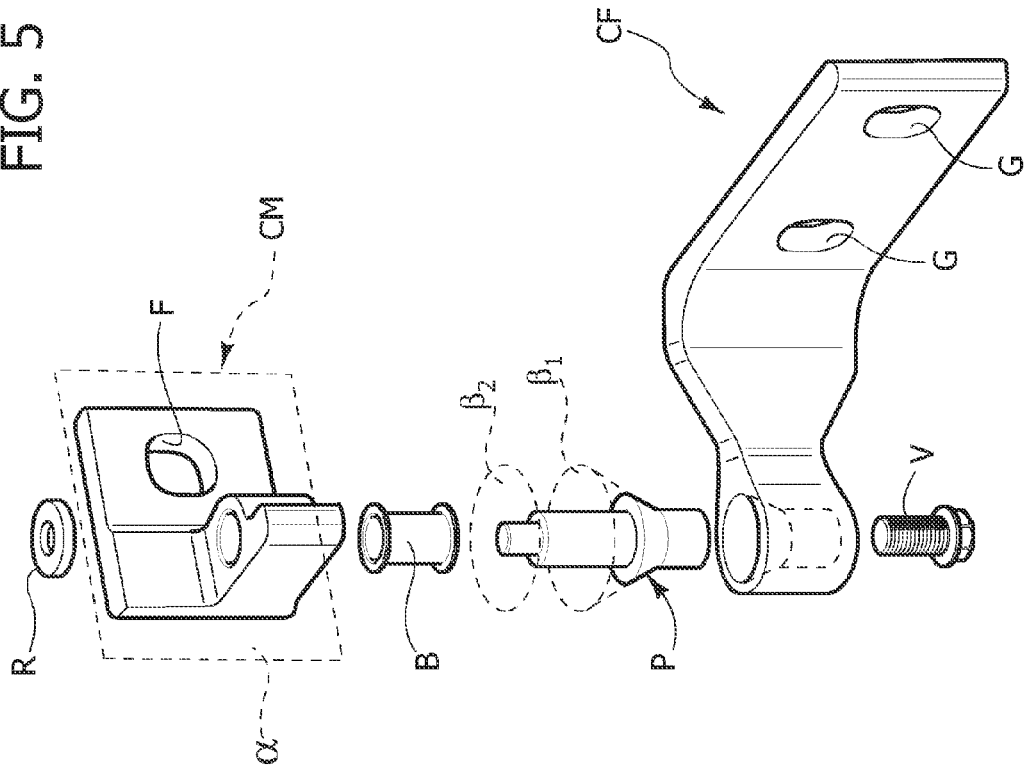
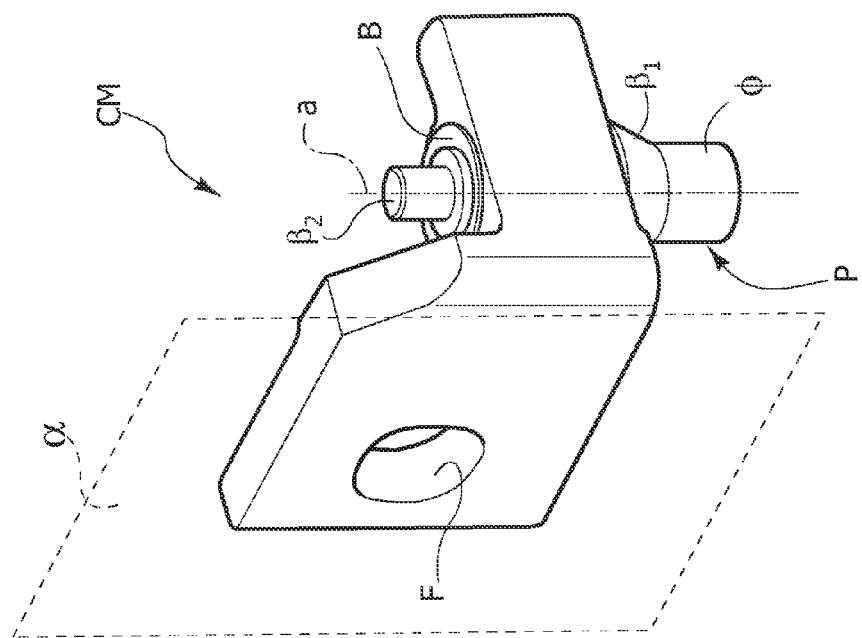

SELF-ADAPTIVE METHOD FOR MOUNTING SIDE DOORS ON MOTOR-VEHICLE BODIES

This application is the U.S. national phase of International Application No. PCT/IB2011/054623 filed 18 Oct. 2011 which designated the U.S. and claims priority to EP 10194673.9 filed 13 Dec. 2010, the entire contents of each of which are hereby incorporated by reference.

FIELD OF THE INVENTION

The present invention refers to the field of methods for manufacturing motor vehicle bodies and in particular methods for the assembly of side doors, of the hinged type, on motor-vehicle bodies.

OBJECTS OF THE INVENTION

The invention has the following main objects:
improving the functional and aesthetic quality of the produced bodies,
eliminating manual operations critical for the reliability of the final product, which are currently applied in the known methods,
simplifying factory logistic systems,
shortening the time required for setting up the production of new motor-vehicle models.

SUMMARY OF THE INVENTION

With the aim of attaining these objects, the invention provides a method having the characteristics indicated in the attached claim 1.

According to the invention, within a system for assembling motor-vehicle bodies, for all the bodies produced or solely for determined bodies, each representing a corresponding production batch, the geometric detection of the points qualifying the coupling of the side doors with the door receiving seats on the body sides is carried out "on-line", by assuming the positioning plane of the body hinge element as a reference plane (the coordinates X, Y, Z respectively corresponding to the longitudinal dimensions, transverse dimensions and the vertical dimension of the body). An opto-electronic system allows determining the "best fit" mounting dimensions required for the self-adaptive mounting of the body side hinge elements in "real time", compensating the deviations from the project dimensions induced by the processes for shaping and assembling the parts constituting the body and ensuring that the positioning of the doors is consistent with the project drawing of the "body complete with mobile parts" assembly.

A specifically developed software program, which transforms the geometrical detections into numerical data that can be read by the machine controls, which performs the self-adaptive operations described hereinafter is used for such purpose. Such software depends on the design shapes of the products and also considers the elastic yielding of the vehicle structure due to the weight of the mounted doors and the nominal pressures required for ensuring the fluid sealing of the elastomeric weather-strips which are applied. The dimension of the body side hinge elements and the relative positioning on the body sides constitute the variables of the self-adaptive process, by which it is possible to provide a compensation of the deviations induced by the chain of tolerances which are inherent in systems for car body manufacturing, either on process (for the non-sufficiently stable deviations), or "una tantum" (only once) when setting up the manufacturing process, or periodically, according to the production batches (for the sufficiently stable deviations).

The doors completed with door hinge elements are produced with project nominal dimensions with sufficiently reduced tolerances, by using a method for mounting the hinge elements which is capable of compensating the deviations from the tolerance range induced by the process for forming the door structures, this compensation being made "una tantum" (only once) when setting up the manufacturing process, or "periodically" according to the production batches.

By the above mentioned methods of the invention, specific doors are rendered biunivocally adapted to a specific body, so that mounting of the doors on the bodies and on the vehicles can be carried out with no need of performing manual or semiautomatic adaptations along the line for completing the body, which would require using suitable calibration instruments on each door and on each door receiving seat on the body.

BRIEF DESCRIPTION OF THE DRAWINGS

Further advantageous characteristics of the method subject of the invention will be described hereinafter, with reference to the attached exemplifying drawings, wherein:

FIG. 4 illustrates an example of a door hinge element connected to the door.

FIG. 5 shows an exploded view of the entire hinge unit, with the body side hinge element indicated with CF, the door side hinge element indicated with CM, the hinge pin P, the bushing B for rotatably mounting the element CM on the pin, the screw V for the engagement of a threaded hole obtained in the lower end of the pin P, for fastening the conical part of the pin within the seat thereof in the hole of the element CF, and the nut-washer R, which is locked on the upper shank $\beta_2$ of the pin P, the references F and G indicating the holes obtained in the elements CF and CM for fixing by means of screws to the body and to the door.

DETAILED DESCRIPTION OF THE INVENTION

According to the invention, within a body assembly system, for all the bodies produced, or solely for determined bodies, each representing a corresponding batch of bodies, the geometrical detection of the points qualifying the coupling of the side doors with the seats on the body side is carried out "on-line".

Figure 1:
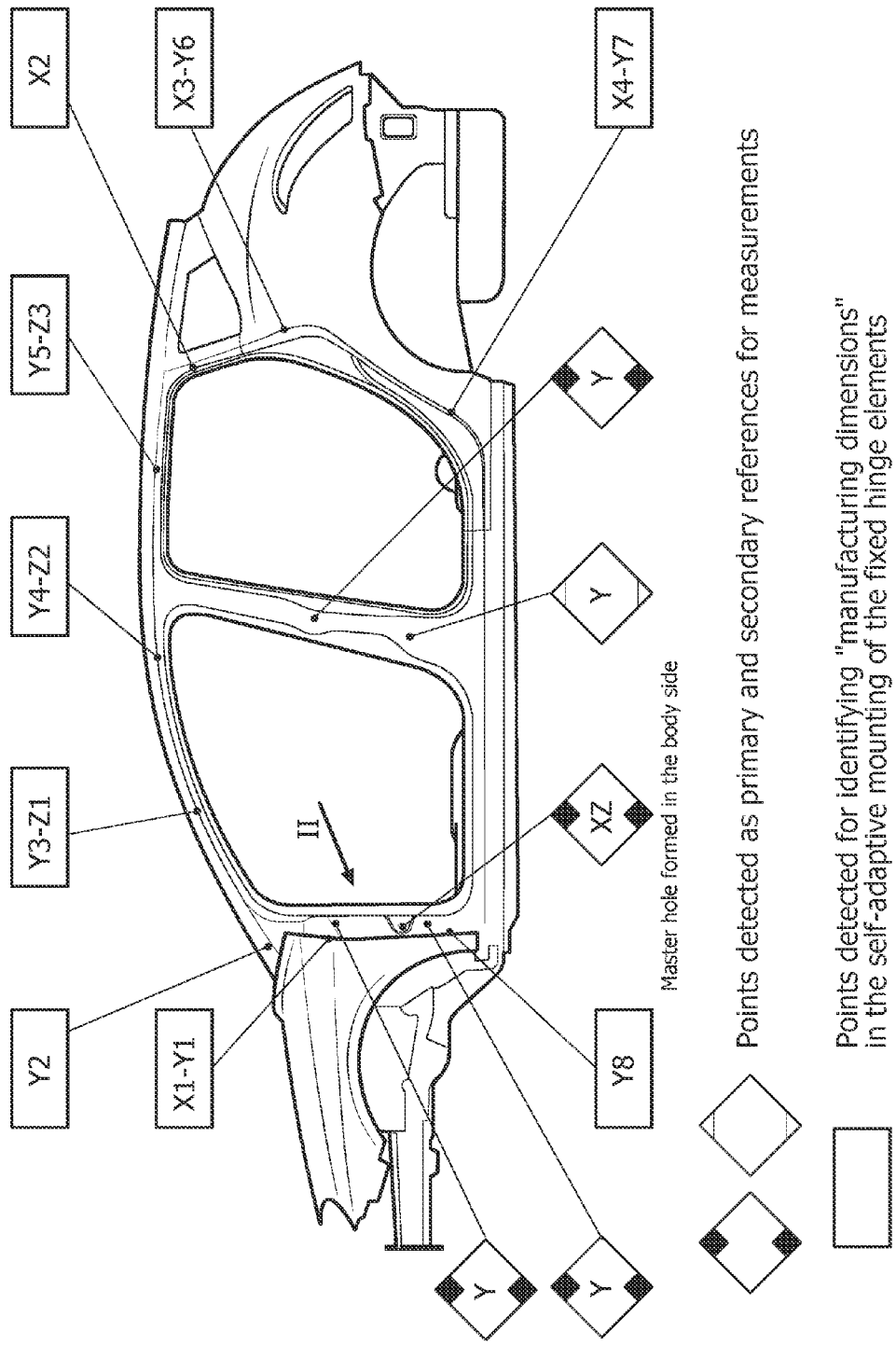
FIG. 1 is a side view of a motor-vehicle body, in which points are indicated which are subjected to an optoelectronic detection, according to an embodiment of the method according to the invention.

FIG. 1 of the attached drawings is a side view of a motor-vehicle body in which the points of the body which are subjected to this detection operation are shown, with reference to a non-limiting example provided herein merely for illustration purposes. In the present description, coordinates X, Y, Z are associated, according to a standard practice, to the longitudinal direction, the transverse direction and the vertical direction respectively of the vehicle body. In FIG. 1, for each point subjected to detection, the respective measured dimensions are indicated. Furthermore, FIG. 1 indicates both points detected as primary references for measurements (see rhombi having black vertices), and points detected as secondary references for measurements (see rhombi with white vertices) as well as points (see symbols surrounded by rectangles) detected for determining the mounting (or manufacturing) dimensions in the self-adaptive mounting of the hinge elements on the vehicle body.

With the aim of performing the aforementioned detection operation, according to the method of the invention there is provided for the "on-line" positioning, at the end of the bodies assembly and welding cycle, a programmable optoelectronic measurement system comprising:

- a multi-axis robot, with accurate repeatable positioning capability,
- a camera, provided with an accurate telemetric sensor, applied to the wrist of the robot,
- an electronic unit connected to the camera, which processes the measurement data in real time according to a predetermined software program;
- a support for positioning the vehicle body on reference elements which mostly are adapted to engage the underbody, so as to locate it in a sufficiently accurate and repeatable manner with respect to a fixed reference at the work station where the abovementioned detection operation is carried out; such support can be positioned on a rotary table having a vertical axis, to enable a bilateral detection by using a single optoelectronic system.

Starting from the measurements carried out in the aforementioned detection station, the mounting dimensions required for installing the side doors consistently with the project drawing are determined, both in a side view and in a transverse cross-section of the assembly constituted by the body and the movable parts.

When starting the pre-series production of a new model, systematic detection of the dimensions of interest is accomplished, so as to define proper frequency of measuring operations statistically. The references of the measurements and the dimensions subject to "critical dispersions" will continue to be detected on each of the produced bodies.

With the aim of obtaining the result of an installation of the doors coherent with the project dimensions, the processing electronic unit uses a software program, which transforms the geometrical detections into numerical data that can be read by the control of a robot which performs the self-adaptive operations described hereinafter.

This software depends on the shape of the vehicle body and considers a geometric correction required to compensate the effect of the elastic yielding of the vehicle structure due to the weight of the completed doors mounted on the vehicle bodies and the nominal pressures on the elastomeric weather-strips, required for ensuring the sealing feature of the doors in their closed condition.

The mode and the frequency of the specific detections for each produced model are controlled by the software program, which also applies determined interpolation rules for the multiple dimensions measured along X, Y and Z.

The mounting dimensions resulting from this elaboration process enable a compensation—when mounting the body hinge elements on the body and the door hinge elements on the door—of the deviations with respect to the design nominal dimensions which are induced by the chain of manufacturing tolerances resulting from the parts of pressed sheet-metal and/or by the systems for assembling and welding vehicle bodies and door structures.

The mounting methods described hereinafter guarantee a sufficient degree of accuracy, both with respect to aesthetic quality (proper correspondence between door profiles and associated coupling gaps) and with respect to functional quality (easy opening and closing of the doors, proper sealing by the weather-strips).

The adaptations which will be illustrated more in detail hereinafter can be performed either "on process", or through "una tantum" (only once) operations during the set-up stage of the product-process, or periodically, in relation to the analysis of measurements carried-out on each vehicle body or on each batch of bodies consecutively produced.

According to the invention, once the dimensions are detected with regard to a plurality of points of the vehicle body qualifying the coupling of the doors with the body, the processing electronic unit determines the "mounting dimensions", hereinafter referred to as "best fit" dimensions, for the self-adaptive mounting of the hinge elements on the two body sides.

In the case of the embodiment considered herein and illustrated in FIG. 1, the hinge elements are secured onto coplanar sections of the body side surfaces, whose plane X/Z is assumed as a reference plane for measuring the Y dimensions orthogonal thereto.

The aforementioned operation for detecting and determining the "best fit" dimensions is performed "on-line" and according to the cadence of the body assembly process.

The aforementioned electronic unit which receives and processes the measurement data is connected to the electronic control of the machining and automated mounting means of the hinge elements to be connected to the body. Regarding the automated mounting, multi-axis manipulator robots, capable of positioning the elements with the required accuracy are used.

Figure 2:
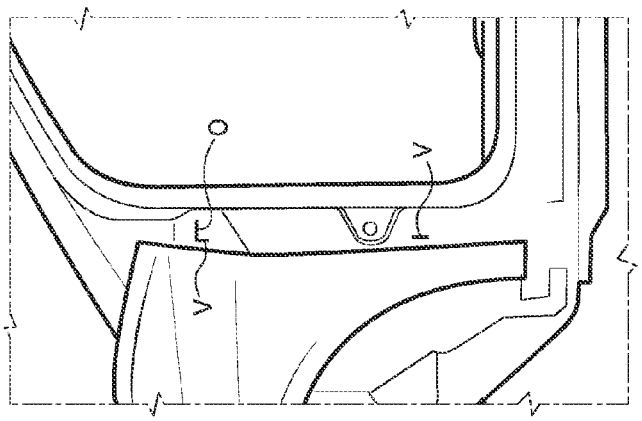
FIG. 2 is an enlarged scale view of the detail II of FIG. 1, where the laser markings obtained in a further embodiment of the method according to the invention are indicated.

If manual mounting is preferred, an optical marking is provided of required references on the body sides for the correct positioning of the hinge elements along X and Z, as schematically illustrated in FIG. 2; such marking is intended to be performed by the same robot that carries the measurement camera and which is also provided with a laser emitter device, with low power and accurate focusing.

As visible in FIG. 2, in the case of the illustrated example there are provided:
- a horizontal line "o", relevant for positioning along the vertical direction,
- two vertical lines "v", relevant for accurate positioning of the hinge rotational axis.

Accurate visibility of the laser lines is obtained through two possible alternative solutions:
- slight incision of the sheet covering by means of thermal laser,
- laser marking on a photosensitive film, which is applied for this purpose at a required small area and removed, during pre-painting treatment of the vehicle body.

Figure 3:
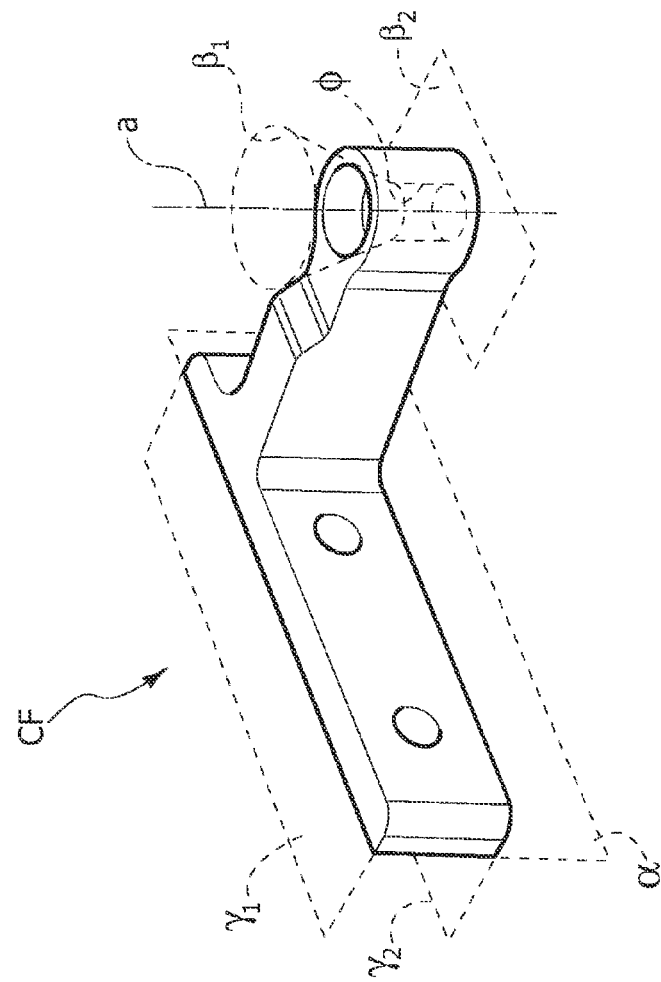
FIG. 3 illustrates an example of a body hinge element connected to the vehicle body.

The annexed FIG. 3 illustrates an exemplifying drawing of a hinge element connected to the body and indicates the references used for the preparation to the self-adaptive mounting. The symbols in such figure have the following meaning:

α: plane for fastening to the body side;
a: door rotation axis;
Φ: cylindrical hinge pin seat;
$\beta_1$: conical seat for supporting the hinge pin;
$\beta_2$: abutment plane for the pin;
$\gamma_1, \gamma_2$: upper and lower walls.

As previously indicated, the method according to the invention provides two alternative methods for the self-adaptive mounting of the body hinge elements to the vehicle body.

First Solution: Automatic Adaptive Mounting

Each pair of body side hinge elements is provided on a platform rotatable around a vertical axis and comprising three work stations on which the following operation steps are performed:

automatic or manual loading of the two body hinge elements, positioned on a reference tool, on said platform so as to determine the required parallel orientation of walls α and the respective peripheral contours, and locking the elements between walls $\gamma_1$ and $\gamma_2$, applying an elastic load along axis (a);

finishing machining of the walls α, performed with a numerical control milling unit, having a horizontal axis spindle, after inserting two parallel pins which abut the cylindrical seats Φ and determine the locking along axis (a) of the conical seats β1 for both elements (during the machining step);

picking up the elements prepared thereby by a mounting robot having the functional characteristics described hereinafter.

The milling unit is provided with numerical control on three axes, interfaced with the electronic unit which determines the "best fit" dimensions regarding the positioning along Y of the door rotation axis.

For the self-adaptive mounting of the elements on the body side there is used a robot of the anthropomorphic type provided with a sufficiently accurate multi-axis control. The robot, selected from among a catalogue of specialized constructors, is specifically set-up for manipulating the elements through a gripper-tool keyed on the wrist of the robot by means of a quick interchange coupling. Such gripper-tool is suitable for picking up the two hinge elements, ensuring the alignment of the axes (a) and the project spacing of the conical seats $\beta_1$, thus maintaining the positioning of the coplanar walls α, according to the arrangement carried out previously. The gripper-tool is for such purpose provided with two actuators for the locking function along axis (a), which apply a thrust on planes $\beta_2$ abutting the conical seats $\beta_1$ by means of precise reference pins inherent to the gripper-tool.

In order to perform the self adaptation of the position of the elements on the plane X-Z of the body side, the control of the robot is interfaced with the electronic unit which determines the "best-fit" dimensions and it is in turn provided with opto-electronic sensors, which allow calibrating the starting point of the motion program, detecting the same "master" reference points assumed by the bodies geometrical detection system described previously.

There are successively provided the following operation steps for the mounting on the body:

the robot transfers the pair of hinge elements through the gripper-tool, and moves them towards the flat surface of the body side on which they must be secured, by "on process" adapting the position of the hinge elements in the plane X/Z, on the basis of the "best fit" dimensions transmitted from the detection system described above;

the robot imparts a determined pressure along Y, through an elastic one-directional cell, so as to abut the coupling plane, guaranteeing the exact contact and the stability of the hinge elements in the step of connection thereof to the structure of the body side;

upon performing the positioning, a second robot, which is provided for performing the automatic fastening operation, inserts and fastens the bolts or the nuts for fastening the body side hinge elements, operating in a coordinated manner within the same station; the fastening is performed while the mounting robot maintains the pair of hinge elements stably against the fastening surface of the body;

the mounting robot disengages the grip elements and returns the gripper-tool in the cycle start position, by performing the rapid interchange thereof if the subsequent operation regards a different design of the hinge elements.

The aforementioned mounting steps are carried out in parallel with the steps for arranging a new pair of hinge elements to be connected to the subsequent body.

As a function of the required productive capacity, the described process can be set with a linear flow layout, arranging on each side of the line a set of machines and apparatus dedicated to each body side. Thus, it may correspond to the typical cadence for large series productions.

Alternatively, for the medium-small production series, the process may be set on two interconnected cells, one dedicated to the bilateral geometrical detection of the body and the subsequent one to the self-adaptive mounting. By Given positioning the body on a support rotatable around s vertical axis, a unique set of machines and equipment can carry out the described method.

Second Solution: Servoassited Adaptive Mounting

The hinge elements are mounted on the body manually. The operation of arranging the hinge elements is identical to the one described above for the automatic mounting, but the gripper-tools, instead of being carried by a robot are carried by a balanced supporting hoist, thus enabling the operator to pick up the pair of body side hinge elements through manual control actuations, however guaranteeing the maintenance of the mutual geometrical setting of the two hinge elements, in the connection step. Using said gripper-tools the operator positions the two hinge elements on the body placing them in contact with the flat fastening surface. At this point the operator adapts the position of the hinge elements on the plane X/Z, abutting the laser markings performed as described previously. This manual adaptation is carried out with the help of a display system, constituted by a camera provided with a screen and opto-acoustic sensors, the gripper-tools being provided with a calibrated edge for the optical collimation.

The operator then actuates the stop of the gripper tool against the surface for fastening the body and introduces and fastens the fastening bolts.

Lastly, the operator controls the disengagement of the gripper and returns the gripper-tool to the beginning of the cycle.

Mounting of the Door Hinge Elements on the Door

After that consistent positioning of the doors on the body has been ensured through automatic or servo-assisted adaptation of the body hinge elements, the same is done for the cooperating door hinge elements to be connected to the doors.

The methods provided for this operation are distinguished according to the construction characteristics of the doors.

Door Unit Constituted by an Inner Frame and an Outer Panel Made of Pressured Sheet-Metal and Connected to Each Other by Conventional Methods With reference to this type of construction, the door hinge elements are of a type commonly used, shown by way of example in the annexed FIG. 4, where the references which are adopted for the self-adaptive mounting are shown.

The symbols indicated in FIG. 4 have the following meaning:

α: flat wall for fastening to the door frame;
Φ: lower cylindrical shank of the pin;
(a): hinge rotational axis;
$\beta_1$: conical section of the pin, which cooperates with a support seat on the body;
$\beta_2$: upper end surface of the pin.

The upper and lower door hinge elements, of identical design, are supplied to the mounting station without the body side hinge elements, which are separately mounted on the body side with the method described previously.

Also for the mounting of the door hinge elements on the door unit there is used a robot of the type described above, having the same technical characteristics and equivalent functionalities, with the task of positioning the hinge elements.

In particular, the grip of the two door hinge elements, by means of the gripper-tool of the robot, determines the mutual alignment of the hinge pins and a proper spacing—according to the project—of the respective pin conical portions $\beta_1$, for support of the pins on the seats arranged with the same spacing on the body.

In preparation for mounting of the door hinge elements on the door unit, no milling of walls α is provided for. The above mentioned tool for preparing the hinge elements determines the coplanar positioning of these walls, the nominal spacing of these walls from axis (a) being guaranteed by the manufacturing process of the hinge elements.

The gripper-tool is provided with locking actuators equivalent to those described for the body side hinge elements. The locking thrust is exerted on surfaces $\beta_2$ of the pin shanks, thus pressing the pins on accurate reference conical seats provided in the gripper-tool.

The mounting operative steps are as follows:

1) The door unit is positioned on a specific reference tool, whose characteristics are described hereinafter; loading of the door can be automated or performed manually by means of a servo-assisted hoist, so as to correctly orient the window frame on the outside panel of the door, placing the door unit on a horizontal support, constructed via a CAD-CAM method; locating elements inherent to such support and clamping actuators are studied so as to provide a shape coupling corresponding to the specific door design.

2) A measurement robot with programmable axes, provided with a sufficiently accurate opto-electronic sensor camera, detects the dimensions along the Y direction required for the geometric control of those parts of the door unit which determine the compression of the sealing weather-strip provided on the door receiving seats on the vehicle body side; the same measurement robot detects—at two points—the position along the X direction of the surfaces of the door structure to which the door hinge elements are to be secured (such measurements are based on geometric references provided on the dedicated tools for positioning the door units).

There is not provided for any compensation—via self adaptive on process operations—of any detected deviations with respect to the nominal project dimensions. Only "una tantum" adaptations are introduced at the end of the operations for setting up the moulds and the dedicated tools used in the system, for manufacturing the door units.

Actually, such deviations are expected to be stable, given that they normally depend by dedicated "mono-tooling" equipments. The detected mean data for the deviation along X are inserted in the "best fit" software program and the adaptation is actuated by the system for mounting the body hinge elements to the body.

3) By means of the gripper-tool, a mounting robot picks up the door hinge elements from the preparation station, guaranteeing when gripping that the walls α are coplanar. By the opto-electronic sensor provided thereon, the robot reads the references along Y, Z provided on the dedicated tool for clamping the door unit and positions the door hinge elements on the coplanar surfaces of the door structure according to the motion program, obtaining the project positioning of the hinge axis on the plane Y-Z and determining the correct contact of the flat walls α by applying a load along X controlled by a mono-directional elastic cell.

4) A second robot specifically dedicated to the automatic bolting, and operating in parallel, inserts the fastening bolts into the door frame and tightens the bolts with a controlled torque. This operating step is carried out while the mounting robot holds the door hinge elements as previously positioned, while applying an elastic load along X.

5) The robot releases the grip on the hinge elements and returns the gripper-tool to the initial position, performing a quick tool change in case the subsequent hinges are of a different design; at the same time the specific tool for positioning of the door unit is transferred to an unloading/loading station, so that this operative step is performed without interfering with the cycle time required for the robotized mounting of the door hinges.

The layout of the installations for carrying out the above described method is provided with three stations respectively dedicated to the operation steps 1/2/3&4 described above, interconnected by a transfer loop along which the dedicated tools for positioning the door units are moved, while alternating right and left doors, front and rear doors, according to the production program.

The installation solutions for transfer, recirculation and programmed introduction of dedicated tools and door units may be various, depending on the productive cadence of the systems for assembling the door units, so as to operate in any case with a constant flow, with suitable operative multi-model flexibility.

The described method provides for a constant production fulfilling the project requirements of door units which can then be installed on the vehicle bodies with no need of any adaptations which would require supplying specific doors in association to a determined body, for final assembly In case it is decided to keep this constraint which is present in the current production methods, thus abandoning the possibility of simplifying the associated logistic process, the above described self-adaptive milling operation along the Y direction of the body hinge elements can be eliminated while the remaining described operating steps for the self-adaptive mounting of said elements on the body sides are maintained unvaried.

With this alternative solution, the compensation of the deviations detected for the dimensions along Y regarding each body produced is performed "on process" by the mounting robot of the door hinges, whose control receives from the "best-fit" electronic unit the variable dimensions for the positioning along Y of the door hinge elements to the frame of the door unit, within the above described operation (step 3). In order to proceed in this way, the mounting system of the door hinges on the door unit should be arranged in parallel with the system for mounting the body hinge elements onto the body, given that the two systems must operate in synchronism.

Doors with Structure of Pressure Die-Casted Aluminium

In this type of construction, the door hinge elements can be integrated in the casted door structure. The required precision is obtained by means of machining of the pin seats at a machine-center, simultaneously with the finishing milling operations of the flat surface portions on which the guides for the movable window pane are positioned.

The machining of the seats of the bushings defining the hinge axis is performed on the basis of references qualifying the peripheral shape of the door units and therefore this machining operation ensures a coherence with the nominal project to an extent sufficient for the proper cooperation with the pin seats on the body. Therefore, this construction solution does not require performing the operation described above with reference to the doors constituted by a frame and an outer panel made of pressed sheet-metal.

Mounting the Doors on the Body and Painting

With the use of the previously described methods, the mounting of the doors on the body can be carried out in a simple and quick manner, given that there does not arises the need for manual or semi-automatic adaptations along the vehicle body completion lines, which would require the biunivocal coupling of each door with a determined body, like in the case of conventional methods.

Therefore, there is no longer any need of mounting the doors on the body before the painting process and of subsequently removing the doors for final assembly of the vehicle, as it generally occurs in the methods currently in use.

Thus, by the methods of the invention, critical operations are eliminated and the logistic system required for the management of the production flows is simplified. The completely automated mounting of the doors on the vehicle bodies is thus rendered feasible (and cost-effective also for industrial installations with high labour costs).

However the same usual painting installations can be used, painting the doors in parallel with the bodies, by arranging the doors on lateral supports provided on the conveyor equipments used in the various stages of the painting process, while providing a cyclical insertion and removal of cover elements for protecting the hinge pins and the pin seats on the body.

This arrangement of the doors spaced and in parallel to the body facilitates the complete automation of the painting process.

Naturally, without prejudice to the principle of the method subject of the invention, the construction details and the embodiments may vary with respect to what has been described and illustrated by way of example, without departing from the scope of protection of the present invention.

The invention claimed is:

1. A method for mounting side doors on a motor vehicle body, wherein each door has a respective door receiving seat in the vehicle body, wherein the doors are connected to the body by means of a pair of hinges each providing a pivot for support and articulation of the door, each hinge consisting of an element for connection to the body and an element for connection to the door, as well as a pin for their mutual rotational articulation, wherein the method comprises the steps of:
detecting, —by means of optoelectronic systems, —a plurality of dimensions measured along coordinates X, Y, Z on the vehicle body and on the doors, with the aid of proper references, for qualifying the geometric conditions of the coupling between the doors and the respective door receiving seats, determining, on the basis of the detected dimensions, the mounting positions of each pair of hinge elements to be connected separately to the vehicle body sides and to the door structures, so as to obtain that the pivots for support and articulation of the doors are well aligned with each other and that the geometrical setting of the door is consistent with the respective door receiving seats on the vehicle body sides, according to the assembly project drawing, mounting the aforementioned hinge elements on the body in the positions thus determined, providing the doors with the respective door hinge elements, while making—via software—the system for mounting the door hinge elements to interact with the system for mounting the body hinge elements, in order to substantially ensure consistency with the assembly project drawing, mounting the doors on the vehicle body by connecting the body side hinge elements and the door hinge elements to each other by simply inserting the respective articulation pins in their seats, with no need of further operations for adjusting and recording the geometrical settings, either along a line for completion of the vehicle body prior to painting, or along a final vehicle assembly line.

2. The method according to claim 1, wherein the steps for detecting and determining the mounting dimensions are carried out on-line according to a pace of the line for assembling the bodies and the door units, so as to perform the required adaptations "on process".

3. The method according to claim 2, wherein the steps for detecting dimensions and determining the assembly positions are carried out by means of programmable control systems, which enables operating on several vehicle models, without requiring a set-up time.

4. The method according to claim 3, wherein said control systems are directly connected to the systems for controlling machining and automated assembling means.

5. The method according to claim 4, wherein each pair of body side hinge elements is provided at a work station so as to obtain:

proper orientation and coplanarity of the walls ($\alpha$) of said hinge elements which come into contact with the coupling surfaces on the body, alignment and coincidence of the hinge axes (a) defined by the two body side hinge elements, proper mutual distance of the support portions ($\beta 1$) of the hinge elements along said hinge axis (a);

said method being further characterised in that coplanar machining of said walls ($\alpha$) is carried out by removing a machining allowance provided for obtaining the proper positioning of the hinge axis on the body along the Y direction, and in that the two body hinge elements thus machined are picked up by means of a gripping tool by a manipulator robot, which carries out the operation of simultaneous self-adaptive mounting of the two hinge elements on the vehicle body.

6. The method according to claim 5, wherein manipulator robots position the body hinge elements on the body side and the door hinge elements on the door structure, maintaining said elements in a stable position by pushing them against the respective connection surfaces, with a controlled unidirectional pressure, while the robot or another fastening system inserts and fastens bolts or nuts which connect the hinge elements to the respective structures.

7. The method according to claim 3, wherein the steps for detecting and determining the mounting dimensions on the vehicle body are also capable of controlling the optical marking on the body of the references required for the assisted manual mounting of the body hinge elements to be connected to the vehicle body.

8. The method according to claim 7, wherein the references for mounting of the body hinge elements on the body are obtained either by means of a slight incision by a thermal laser effect or alternatively by means of laser marking on a photo-sensitive film, applied on a selected part of the body.

9. The method according to claim 1, wherein the detecting is carried out through the following steps:
   detecting firstly at least three points of the flat surfaces of the body sides on which the body hinge elements are fastened,
   assuming said surfaces as reference planes for the measurements along the Y direction,
   carrying out the required interpolations of the measurement data, as a function of the optimisation of the coupling profiles between the doors and the respective door receiving seats on the body sides.

10. The method according to claim 1, wherein the detecting step is programmed for performing said step for determining the mounting "best fit" dimensions, considering the coupling profiles defined by the shape of the vehicle body, as well as the elastic yielding of the vehicle structure due to the weight of the door and the pressure required for ensuring a proper sealing action of the elastomeric weather-strips applied on the body.

11. The method according to claim 1, wherein the door structure is made of pressure die-casted aluminium and comprises—integrated therein—the door hinge elements, the seats for the articulation pin on said door hinge elements being finished by machining on a machine-center, consistently with the position of flat surface portions of the door structure on which the guides for the sliding window pane are secured.

12. A method for mounting a side door on a motor vehicle body, wherein said door has a respective door receiving seat in the vehicle body, wherein the door is connected to the body by means of a pair of hinges for support and articulation of the door, each hinge consisting of a body hinge element for connection to the body, a door hinge element for connection to the door, and a pin for mutual articulation of said body hinge element and said door hinge element,
   wherein the method comprises the steps of:
      detecting, by means of optoelectronic systems, a plurality of dimensions measured along coordinates X, Y, Z on the vehicle body,
      detecting, by means of optoelectronic systems, a plurality of dimensions measured along coordinates X, Y, Z on the door,
      determining, for each hinge, on the basis of the dimensions detected in said detecting steps, the mounting position of said body hinge element on the vehicle body, and the mounting position of said door hinge element on the door, in such a way as to obtain not only that the pivots of the two hinges for support and articulation of the door are well aligned with each other bu also that the door, once assembled on the vehicle body, is properly positioned and aligned with the respective door receiving seat on the vehicle body side,
      mounting the aforementioned body hinge elements on the body in the positions thus determined,
      mounting said door hinge elements on the door, while making—via software—the system for mounting the door hinge elements to interact with the system for mounting the body hinge elements, in order to substantially ensure consistency with an assembly project drawing,
      mounting the door on the vehicle body by connecting the body hinge elements and the door hinge elements to each other by simply inserting the respective articulation pins in their seats, with no need of further operations for adjusting and recording the geometrical settings, either along a line for completion of the vehicle body prior to painting, or along a final vehicle assembly line.

* * * * *